(12) United States Patent
Chiang et al.

(10) Patent No.: US 10,855,997 B2
(45) Date of Patent: Dec. 1, 2020

(54) SECONDARY TRANSFORM KERNEL SIZE SELECTION

(71) Applicant: MediaTek Inc., Hsinchu (TW)

(72) Inventors: Man-Shu Chiang, Hsinchu (TW); Chih-Wei Hsu, Hsinchu (TW); Tzu Der Chuang, Hsinchu (TW); Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/946,765

(22) Filed: Apr. 6, 2018

(65) Prior Publication Data

US 2018/0302631 A1 Oct. 18, 2018

Related U.S. Application Data

(60) Provisional application No. 62/485,406, filed on Apr. 14, 2017.

(51) Int. Cl.
*H04N 19/176* (2014.01)
*H04N 19/61* (2014.01)
*H04N 19/122* (2014.01)
*H04N 19/157* (2014.01)
*H04N 19/124* (2014.01)

(52) U.S. Cl.
CPC ......... *H04N 19/176* (2014.11); *H04N 19/122* (2014.11); *H04N 19/124* (2014.11); *H04N 19/157* (2014.11); *H04N 19/61* (2014.11)

(58) Field of Classification Search
CPC .. H04N 19/176; H04N 19/157; H04N 19/124; H04N 19/61; H04N 19/12; H04N 19/122

USPC ......................................................... 375/240
See application file for complete search history.

(56) References Cited

U.S. PATENT DOCUMENTS

| | | | | |
|---|---|---|---|---|
| 2012/0170649 | A1* | 7/2012 | Chen | H04N 19/159 375/240.12 |
| 2012/0320972 | A1* | 12/2012 | Ma | H04N 19/147 375/240.03 |
| 2014/0254661 | A1* | 9/2014 | Saxena | H04N 19/625 375/240.2 |
| 2017/0094313 | A1* | 3/2017 | Zhao | H04N 19/61 |

(Continued)

FOREIGN PATENT DOCUMENTS

| | | |
|---|---|---|
| CN | 103096064 A | 5/2013 |
| CN | 103404147 A | 11/2013 |

(Continued)

OTHER PUBLICATIONS

State Intellectual Property Office, International Search Report and Written Opinion for International Patent Application No. PCT/CN2018/082967, dated Jun. 8, 2018.

*Primary Examiner* — Susan E. Hodges
(74) *Attorney, Agent, or Firm* — Han IP PLLC; Andy M. Han

(57) ABSTRACT

A method and apparatus related to secondary transform operations. In which, the non-zero transform coefficients in a particular subset of the transform coefficients of the block of pixels is counted and compared with a particular threshold so as to determine whether or not to perform the secondary transform on the block of pixels. Besides, the optimal secondary transform kernel size is derived implicitly based on the size of the block, or derived explicitly based on a flag coded by using an adaptive code word.

20 Claims, 12 Drawing Sheets

(56) References Cited

U.S. PATENT DOCUMENTS

2017/0264918 A1* 9/2017 Thirumalai ............ H04N 19/13
2018/0309990 A1* 10/2018 Alshina ................. H04N 19/70

FOREIGN PATENT DOCUMENTS

CN         103796014 A    5/2014
WO   WO 2017058615 A1   4/2017

* cited by examiner

SECONDARY TRANSFORM KERNEL SIZE SELECTION

CROSS REFERENCE TO RELATED PATENT APPLICATION(S)

The present disclosure is part of a non-provisional application that claims the priority benefit of U.S. Provisional Patent Application No. 62/485,406, filed on 14 Apr. 2017. Content of above-listed application is herein incorporated by reference.

TECHNICAL FIELD

The present disclosure relates generally to video processing. In particular, the present disclosure relates to signaling selection of transform operations.

BACKGROUND

Unless otherwise indicated herein, approaches described in this section are not prior art to the claims listed below and are not admitted as prior art by inclusion in this section.

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs). After prediction, one CU is further split into transform units (TUs) for transform and quantization.

Like many other precedent standards, HEVC adopts Discrete Cosine Transform type II (DCT-II) as its core transform because it has a strong "energy compaction" property. Most of the signal information tends to be concentrated in a few low-frequency components of the DCT-II, which approximates the Karhunen-Loève Transform (KLT, which is optimal in the decorrelation sense) for signals based on certain limits of Markov processes.

In addition to DCT transform as core transform for TUs, secondary transform is used to further compact the energy of the coefficients and to improve the coding efficiency. Non-separable transform is used for the secondary transform and is called non-separable secondary transform (NSST). Such as in JVET-D1001, Non-separable transform based on Hypercube-Givens Transform (HyGT) is used as secondary transform, which is referred to as non-separable secondary transform (NSST). The basic elements of this orthogonal transform are Givens rotations, which are defined by orthogonal matrices G(m, n, θ), which have elements defined by:

$$G_{i,j}(m, n) = \begin{cases} \cos\theta & i = j = m \text{ or } i = j = n, \\ \sin\theta & i = m, j = n, \\ -\sin\theta & i = n, j = m, \\ 1, & i = j \text{ and } i \neq m \text{ and } i \neq n \\ 0, & \text{otherwise} \end{cases}$$

HyGT is implemented by combining sets of Givens rotations in a hypercube arrangement.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for signaling a kernel size of secondary transform for decoding a block of pixels. A decoder receives data associated with a block of pixels to be decoded as a current block of a current picture of video. The decoder applies inverse non-separable secondary transform (NSST) to transform coefficients of the block of pixels according to an NSST kernel size selected from a plurality of possible kernel sizes when determining a count of non-zero transformed coefficients in a particular subset of the transformed coefficients of the block of pixels is greater than a first threshold. The decoder decodes using the selected NSST kernal size that is derived according to a width of the block or a height of the block. In applying the inverse NSST, the decoder applies inverse 4×4 NSST to first 8 or 16 coefficients for a transform block based on the width or the height of the block being less than a second threshold. Alternatively, in applying the inverse NSST, the decoder applies inverse 8×8 NSST to first 8 or 16 coefficients for a transform block based on the width and the height of the block being greater than or equal to the second threshold. The inverse 4×4 NSST and the inverse 8×8 NSST indicate different kernal sizes and the particular subset of the transformed coefficients depends on the width of the block or the height of the block.

In some embodiments, the NSST is applied according to an NSST kernel size selected from a plurality of possible kernel sizes. The decoder further derives the NSST kernel size according to a width or a height of the block. Then, the decoder applies the inversed NSST by applying inverse 4×4 NSST to first 8 or 16 coefficients based on the width or the height of the block being less than a second threshold or applying inverse 8×8 NSST to first 8 or 16 coefficients based on the width and the height of the block being greater than or equal to the second threshold.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

In JEM-4.0, the choice of the size of non-separable secondary transform (NSST) is dependent on the transform size. For example, if both the width and the height of the transform are larger than 4, then 8×8 NSST is applied; otherwise, 4×4 NSST is applied. In addition, the secondary transform is applied when the number of non-zero coefficients within the entire block is greater than a threshold. When applied, the non-separable transform is performed on the top-left 8×8 or smaller region, i.e., min(8,W)×min(8,H), of a transform coefficient block. The above transform selection rule is applied for both luma and chroma components and the NSST kernel size depends on the current coding block size. According to JEM-4.0, NSST is performed only on the top-left min(8, width)×min(8, height) region of the TU, even if the non-zero coefficients are located outside of that top-left region. This may cause redundant NSST operations on the top-left min(8, width)×min(8, height) subset of coefficients of the TU even though the non-zero coefficients are outside of the top-left min(8, width)×min(8, height) region. In this invention, if not specifically defined, "coefficients" means the coefficients after applying core transform (which can be DCT such as DCT-II or DST such as DST-VII) and secondary transform. In other words, "coefficients" means the coefficients received at decoder and applied with inverse quantizing. "coefficient" is also named "transform coefficient" or "transformed coefficient" in this invention.

Figure 1:
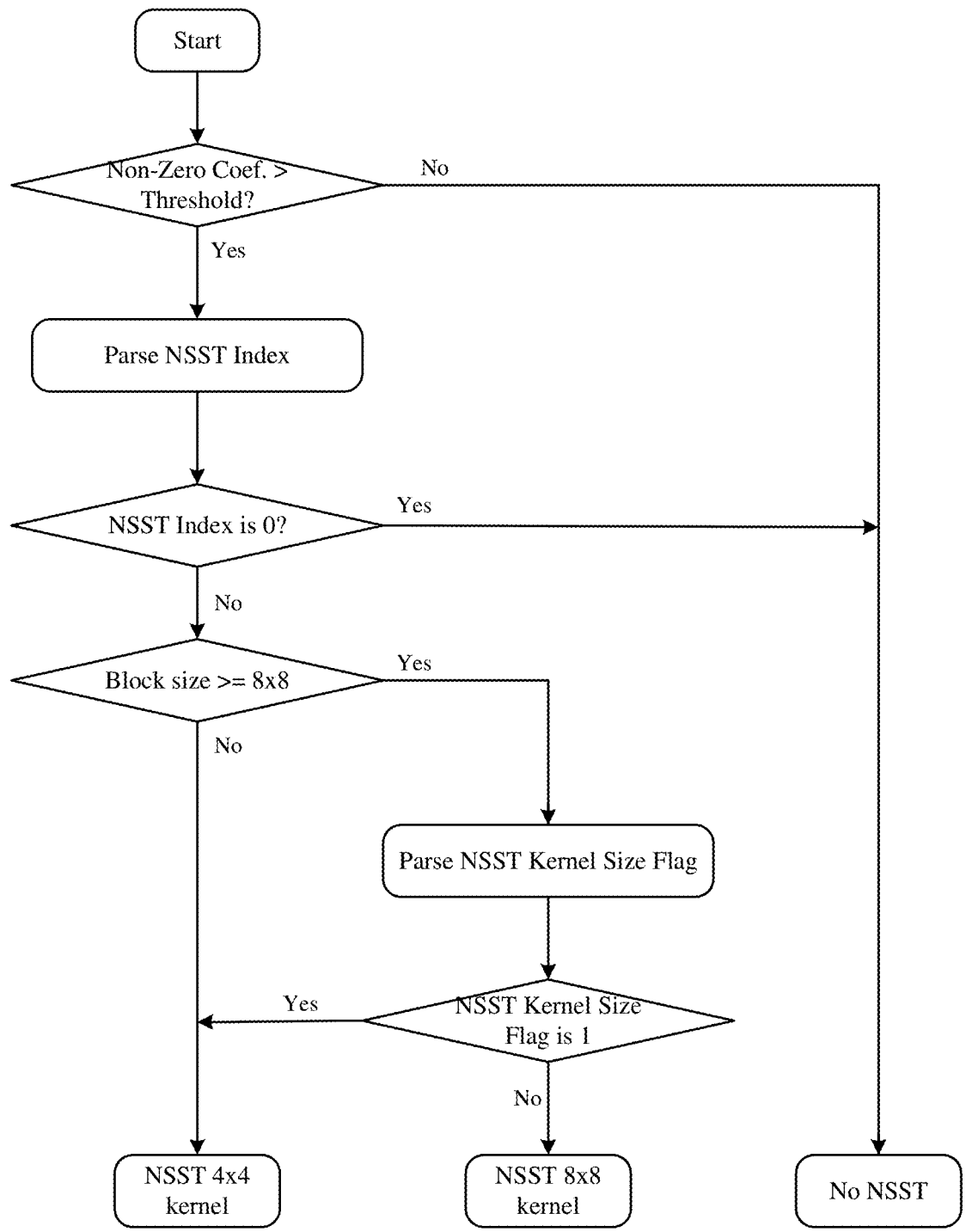
FIG. 1 illustrates a framework of selecting a secondary transform kernel size for a block of pixels.

FIG. 1 illustrates a framework of selecting a secondary transform kernel size for a block of pixels. As illustrated, NSST is performed as long as the number of non-zero coefficients in the entire block of pixels is greater than a threshold and when NSST index is not 0. If block size is less than 8×8, the NSST kernel size of 4×4 is always selected. If block size is 8×8 or greater, a flag (NSST_kernel_size_flag) expressly select between NSST kernel size of 4×4 or NSST kernel size of 8×8.

However, it is empirically determined that to select NSST kernel size for over 8×8 blocks may bring modest coding gain (bitrate-distortion gain) but suffer significant encoding time increases. Specifically, always using a flag to explicitly signal the selection of the NSST kernel size for over 8×8 blocks may limit bitrate-distortion enhancement by employing too many additional rate-distortion optimization (RDO) checks or flags. Furthermore, larger blocks (8×8 or greater) may have non-zero coefficients concentrated in low frequency area such as 4×4 sub-block region so that the best secondary transform is not always 8×8 NSST.

Some embodiments of the disclosure provide a method for signaling secondary transform kernel size (e.g., NSST kernel size) when decoding a block of pixels. The secondary transform kernel size is implicitly derived in specific conditions to reduce bitrate. For example, secondary transform kernel size is implicitly derived without signaling in all cases. For another example, the method also allows signaling for selection of secondary transform kernel sizes in addition to 4×4 and 8×8.

In some embodiments, the non-separable secondary transform (NSST) is applied according to an NSST kernel size selected from a plurality of possible kernel sizes. The decoder further derives the NSST kernel size according to a width or a height of the block. The decoder determines whether the inverse secondary transform is agglied to the transform coefficients within a predefined region of the TU (e.g., top-left 4×4, 8×8 region, or first 8 or 16 transform coefficients in a scanning order for a transform block or a tog-left 4×4 region) degending on the number of non-zero transform coefficients within the garticular region. For example, the inverse secondary transform is gerformed only when the number of non-zero transform coefficients within the particular region is greater than a first threshold where the first threshold is an integer such as 0 or any positive integer. Non-zero transform coefficients outside of the particular region do not count toward triggering inverse secondary transform operations. For another example, the inverse secondary transform is performed only when the number of non-zero transform coefficients within the particular region is not greater than an another threshold where the another threshold is an integer such as 0 or any positive integer. The block of pixels may be coded by intra-prediction. Assume that the above-mentioned conditions for enabling NSST or inverse NSST are satisfied. If the predefined region refers to first 8 or 16 transform coefficients in a scanning order for a transform block or a top-left 4×4 region, then, the decoder applies the inversed NSST by applying inverse 4×4 NSST to first 8 or 16 coefficients in a scanning order for a transform block or top-left 4×4 region based on the width or the height of the block being less than a second threshold or applying inverse 8×8 NSST to first 8 or 16 coefficients in a scanning order for a transform block or top-left 4×4 region based on the width and the height of the block being greater than or equal to the second threshold. In one embodiment, the second threshold is an integer such as 8 or any positive integer. In this invention, "scanning order" means forward scanning order or diagonal scanning order.

In some embodiments, an encoder or decoder operating the signaling method receives a block of pixels. The encoder or decoder determines a count of non-zero transform coefficients in a particular subset of the transform coefficients of the block of pixels. When the count is greater than the first threshold, the encoder or decoder codes the block of pixels by performing non-separable secondary transform (NSST) or inverse NSST for the block of pixels. When the count is less than or equal to the first threshold, the encoder or decoder codes the block of pixels without performing NSST or inverse NSST for the block of pixels. In this invention, "block" refers to a transform block (TB), transform unit (TU), coding block (CB), or coding unit (CU).

Figure 2:
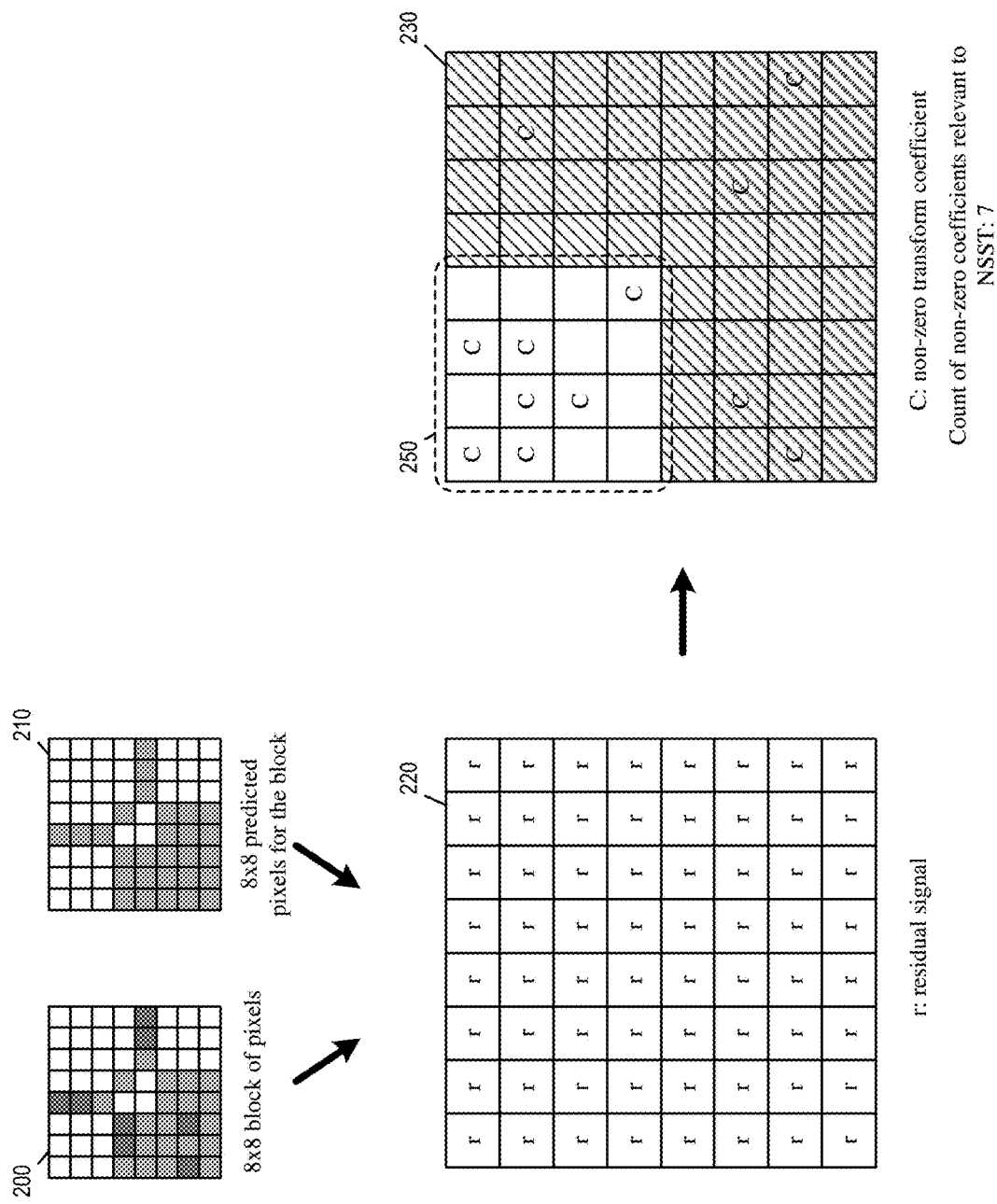
FIG. 2 illustrates the counting of non-zero transform coefficients of a block of pixels for determining whether to perform NSST or inverse NSST or inverse NSST for the block of pixels.

FIG. 2 illustrates the counting of non-zero transform coefficients of a block of pixels for determining whether to perform NSST or inverse NSST for the block of pixels. The figure illustrates an example 8×8 pixel block 200. During encoding or decoding, the encoder produces a corresponding set of 8×8 predicted pixels (or predictor) 210 for the block by inter-prediction or intra-prediction. The difference between the block of pixels 200 and its corresponding set of predicted pixels 210 is a set of 8×8 residuals 220 (each residual value is illustrated as 'r'). A core transform (which can be DCT such as DCT-II or DST such as DST-VII) is performed on the residuals 220 to obtain a set of 8×8 transform coefficients 230. The transform coefficients 230 are quantized such that some of the transform coefficients are quantized to zero. Each Non-zero coefficient is illustrated as 'C'. Zero coefficients are not marked.

For this example, the secondary transform or NSST is performed for only the top-left 4×4 transform coefficients (region 250). NSST is not performed on coefficients that lay outside of the top-left 4×4 coefficients. (In the example illustrated, coefficients that are part of NSST are not shaded, while coefficients that are not part of NSST are shaded). For some embodiments, the top-left 4×4 coefficients (region 250) represent the most significant subset of the transform coefficients or the first 16 coefficients (in forward scanning order or diagonal scanning order for a transform block or top-left 4×4 region) upon which NSST is applied. For another example, the secondary transform or NSST is performed for the top-left 8×8 transform coefficients or any subset of the top-left 8×8 transform coefficients. For some embodiments, the subset of the top-left 8×8 coefficients represents the most significant subset of the transform coefficients. For example, the most significant subset of the transform coefficients includes the top-left 4×4 transform coefficients, the bottom-left 4×4 transform coefficients, and top-right 4×4 transform coefficients.

For the purpose of determining to perform NSST or inverse NSST on the block of pixel 200, the encoder or decoder in some embodiments counts only the non-zero transform coefficients within a particular subset being larger than a first threshold. For example, the particular subset is the region which NSST or inverse NSST would be performed, i.e., the most significant or top-left 4×4 coefficients (in the un-shaded region 250). For another example, the particular subset may be top-left 4×4 or 8×8 transform coefficients, or the first 8, 16, 48, or 64 transform coefficients in a forward or diagonal scanning order for a transform block. The particular subset may be top-left 4×4 or 8×8 transform coefficients, or the first 8, 16, 48, or 64 transform coefficients in a forward or diagonal scanning order for a top-left 8×8 or 4×4 region. The particular subset may exclude the transform coefficient in the DC position (the first position) for a transform block. The particular subset depends on the width of the block or the height of the block. For example, when the width of the block is equal to the height of the block, the particular subset may be the first 8 transform coefficients in a forward or diagonal scanning order for a top-left 4×4 region. For example, when the width of the block is not equal to the height of the block, the particular subset may be the first 16 transform coefficients in a forward or diagonal scanning order for a top-left 4×4 region. The particular subset may exclude the transform coefficient in the DC position, Non-zero coefficients in shaded region outside of the particular subset are not counted. In the example of the particular subset being the top-left 4×4, there are 12 non-zero coefficients in total among all 8×8 transform coefficients 230, but only the 7 non-zero coefficients in the top-left 4×4 count toward determining whether to perform NSST on the block 200. The five non-zero coefficients outside of the top-left 4×4 are considered irrelevant and are not counted. This minimizes or avoids redundant NSST operations on pixel blocks whose non-zero coefficients are not in the most significant/top-left 4×4.

The encoder or decoder performs NSST or inverse NSST when the count of non-zero coefficients in the particular subset is greater than a first threshold (e.g., perform NSST or inverse NSST when the count is equal or greater than two). If the count is less than or equal to the first threshold, the encoder or decoder would not perform NSST or inverse NSST for the block, even when there are more non-zero coefficients outside of the particular subset. Based on the count of non-zero coefficients being less than or equal to the first threshold, encoder or decoder infers NSST or inverse NSST as disabled without any explicit flag in the bitstream. For example, the NSST index is inferred as zero. If not specifically defined, "performing NSST or inverse NSST" means that NSST or inverse NSST is allowed for performing on the block and the usage of NSST or inverse NSST still depends on the NSST selection (e.g. the NSST index).

For the purpose of determining to perform NSST or inverse NSST on the block of pixel 200, the encoder or decoder in some embodiments counts only the non-zero transform coefficients within a particular subset being not greater than an another threshold. The particular subset may be the coefficients within the block excluding top-left 4×4 or 8×8 transform coefficients, or the first 8, 16, 48, or 64 transform coefficients in a forward or diagonal scanning order for a top-left 8×8 or 4×4 region. The particular subset depends on the width of the height of the block. For example, when the width of the block is equal to the height of the block, the particular subset may be the coefficients within the block excluding the first 8 transform coefficients in a forward or diagonal scanning order for a top-left 4×4 region. For example, when the width of the block is not equal to the height of the block, the particular subset may be the coefficients within the block excluding the first 16 transform coefficients in a forward or diagonal scanning order for a top-left 4×4 region.

One of ordinary skill would understand that the choice of the 8×8 block of pixels 200 and a 4×4 subset of transform coefficients 250 is for illustrative purpose only. The technique of counting non-zero transform coefficients can be applied to any other size of block of pixels, e.g., top-left 8×8, most significant 8×8, or the first 8, 16, 48, or 64 transform coefficients in a scanning order, or top-left or most significant 16×16 or 32×32.

In some embodiments, the encoder or decoder indicate/determines the kernel size of the secondary transform by encoding/decoding an explicit flag to select the kernel size. The flag signaling the kernel size may not always be required and is applied under specific conditions, such as specific block sizes. In some embodiments, the explicit flag for selecting the kernel size is present when the size of the block is greater than a threshold. The flag may be coded in a slice header, a sequence header, or a picture header of a bitstream. When the size of the block is less than the threshold, the encoder does not encode the flag into the bitstream and the decoder does not expect the flag in the bitstream.

For example, for 8×8 blocks, the flag is employed and used to select the preferred NSST kernel size. As for blocks with sizes greater than 8×8, the NSST kernel size may be fixed at 8×8 or be decided by a flag at SPS, PPS, or slice level (e.g., at their respective headers). The NSST kernel size for blocks with sizes greater than 8×8 may also be inferred/derived implicitly.

In some embodiments, whether a flag for secondary transform kernel size selection is explicitly signaled is based on the complexity of the block. In other words, the encoder explicitly signals, and the decoder expects, an explicit flag for secondary transform kernel size selection when the complexity of the block is greater than a threshold; otherwise an implicit mechanism is used to signal the kernel size selection. More generally, whether the explicit flag is signaled/expected is decided by the properties of the block of pixels being coded. For example, in some embodiments, an explicit flag for kernel size selection is signaled/expected when a count of non-zero coefficients in a subset of the transform coefficients is greater than first threshold. This subset of transform coefficients can be the top-left or first subset of the transform coefficients (e.g., the top-left or first 4×4 or 8×8 coefficients), or any other subset of the transform coefficients, or the entire set of transform coefficients of the block being coded.

In some embodiments, the flag for secondary transform kernel size selection is explicitly signaled by a code word that identifies the kernel size. For each block of pixels being coded, the encoder and decoder dynamically assign code words of different lengths to different possible kernel sizes. In some embodiments, the code words are assigned according to costs associated with coding the block of pixels under the different possible kernel sizes. The lowest cost kernel size is regarded as the predicted kernel size and assigned the shortest code word. Higher cost kernel sizes are assigned longer code words. In other words, different kernel sizes are assigned different code words according to an ordering determined by the computed costs of the different kernel sizes. For example, when there are 4 possible kernel sizes (e.g., 4×4, 8×8, 16×16, and 32×32), the lowest cost kernel size is assigned the shortest code word '0', the second lowest is assigned code word '10', the third lowest is assigned code word '110', and the highest is assigned code word '111'.

When the encoder selects a secondary transform kernel size to perform the secondary transform, the selected secondary transform kernel size is signaled to the decoder by sending the code word that is assigned to the selected secondary transform kernel size. The decoder maps the received code word to the correct secondary transform kernel size by performing the same cost computation and code word assignment as the encoder for the block of pixels.

Whenever the secondary kernel size selected by the encoder to perform the secondary transform matches the predicted kernel size, the bit rate is reduced because the shortest code word is used to signal the selection of the kernel size. As the cost-based code word assignment scheme successfully predicts the kernel size for more blocks, the less bit rate will increase due to explicit signaling of secondary transform kernel size. A dataflow of cost computation and code word assignment for different secondary transform kernel sizes will be further described below by reference to FIGS. 8 and 11 below.

The signaling method in different embodiments calculates the costs differently. In some embodiments, the cost is obtained by measuring the features of the reconstructed residuals. In some embodiments, the cost is obtained by measuring the difference between the reconstructed pixels at the block's boundary and the reconstructed pixels in neighbor blocks. In some embodiments, only a subset of the reconstructed residuals or a subset of the reconstructed pixels (e.g., top-left 8×8, 4×4, or any other subset of pixels) is measured when computing the cost. In some embodiments, the cost for each kernel size is computed by applying inverse NSST of that kernel size to a subset of the transform coefficients (e.g., first 8, 16, 48, or 64 transform coefficients in the forward scanning order, or any other subset of transform coefficients). Transform coefficients outside of the subset are not used for computing the costs.

Both the encoder and the decoder are able to obtain the reconstructed residuals and reconstructed pixels of the current block. The quantized transform coefficients of the current block (produced by the core and/or secondary transform) are de-quantized and then inverse transformed (by the inverse secondary and/or core transform) to generate the reconstructed residuals. (Residuals refer to difference in pixel values between source pixel values of the block and the predicted pixel values of the block generated by intra or inter prediction; and reconstructed residuals are residuals reconstructed from transform coefficients.) By adding the reconstructed residuals with predictors or predicted pixels generated by intra or inter prediction for the block, the pixels of the current block can be reconstructed. Examples of such encoders and decoders will be described by reference to FIGS. 6 and 9 below.

Figure 3:
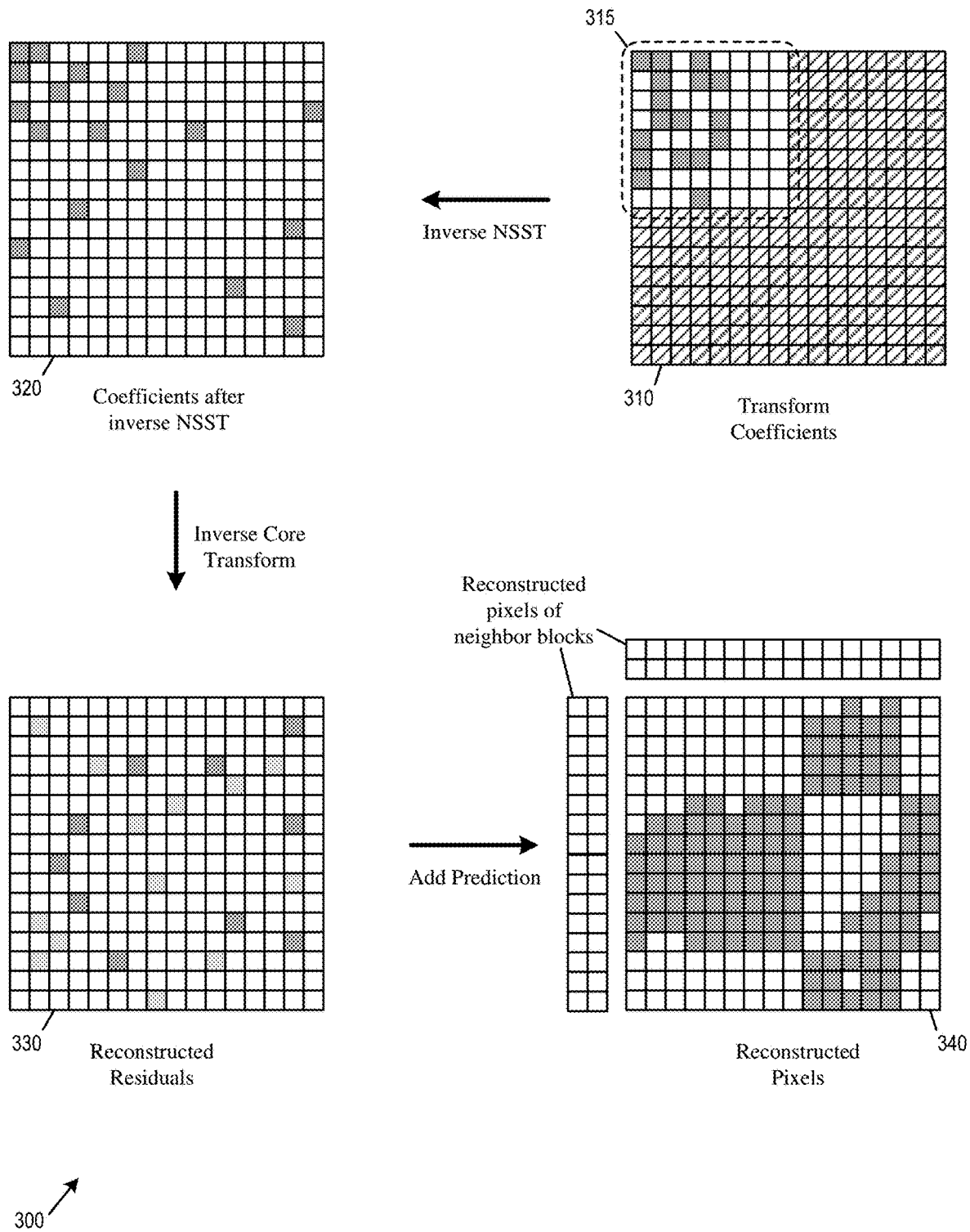
FIG. 3 illustrates the computation of costs based on the reconstructed pixels for candidate NSST kernel sizes and the neighboring reconstructed blocks.

FIG. 3 illustrates the computation of costs based on the reconstructed pixels for candidate NSST kernel sizes and the neighboring reconstructed blocks.

The figure illustrates an example TU 300 of a 16×16 block of pixels. The TU has 16×16 transform coefficients, but only the top-left 8×8 transform coefficients (or the first 64 transform coefficients in a scanning order) are used for secondary transform. As illustrated, for the TU 300, the encoder has encoded (or the decoder has received) a set of 16×16 quantized transform coefficients 310. The top-left 8×8 subset 315 of the coefficients is inverse transformed by secondary transform of the kernel size into a set of intermediate transform coefficients 320. The transform coefficients outside of the subset 315 are not used for inverse transform of secondary transform. Inverse core transform is applied to the set of intermediate transform coefficients 320 to generate a set of 16×16 reconstructed residuals 330. The reconstructed residuals 330 is combined with a set of prediction pixels (not illustrated) to reconstruct a set of 16×16 reconstructed pixels 340.

In some embodiments, the cost associated with the kernel size is computed based on the reconstructed residuals 330. In some embodiments, the cost associated with the kernel size may be computed based on a subset of the reconstructed residuals, e.g., a top-left 8×8 sub-block of the reconstructed residuals 330. The subset may also take on other shapes or include different number of residuals than the top-left 8×8.

In some embodiments, the cost associated with the kernel size is computed based on the reconstructed pixels 340. In some embodiments, the cost associated with the kernel size may be computed based on a subset of the reconstructed pixels, e.g., a top-left 8×8 sub-block of the reconstructed pixels 340. The subset may also take on other shapes or include different number of pixels than the top-left 8×8.

Figure 4:
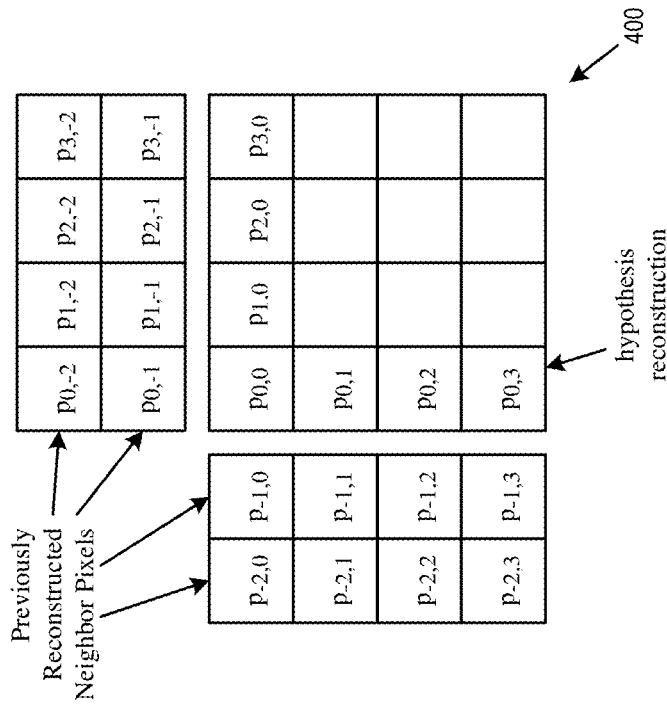
FIG. 4 illustrates the computation of cost for a TU based on correlation between reconstructed pixels of the current block and reconstructed pixels of neighboring blocks.

In some embodiments, a boundary-matching method is used to compute the costs. Assuming the reconstructed pixels are highly correlated to the reconstructed neighboring pixels, a cost for a particular transform kernel size can be computed by measuring boundary similarity. FIG. 4 illustrates the computation of cost for a TU 400 based on correlation between reconstructed pixels of the current block and reconstructed pixels of neighboring blocks (each pixel value is denoted by p). In some embodiments, only a subset of the reconstructed pixels (e.g., top-left 8×8 sub-block of the reconstructed pixels 340) is used for computing the cost of one particular secondary transform kernel size. The cost associated with the kernel size based on the reconstructed pixels is calculated as:

$$\text{cost} = \sum_{x=0}^{w-1} |(2p_{x,-1} - p_{x,-2}) - p_{x,0}| + \sum_{y=0}^{h-1} |(2p_{-1,y} - p_{-2,y}) - p_{0,y}|$$

This cost computation is based on pixels along the top and left boundaries (boundaries with previously reconstructed blocks) of the TU. In this boundary matching process, only the border pixels are reconstructed. In some embodiments, the transform coefficients can be adaptively scaled or chosen to do the reconstruction. In still another embodiment, the reconstructed residuals can be adaptively scaled or chosen to do the reconstruction.

In still another embodiment, the subset of the reconstructed pixels used to calculate the cost may have a different shape and include different numbers of pixels (e.g., only top, only above, only left, or other collection of pixels). In still another embodiment, different cost function can be used to measure the boundary similarity. For example, in some embodiments, the boundary matching cost function may factor in the direction of the corresponding intra prediction mode for the NSST. (Each intra-prediction mode is mapped to a set of NSST transforms at different rotation angles.)

Figure 5:
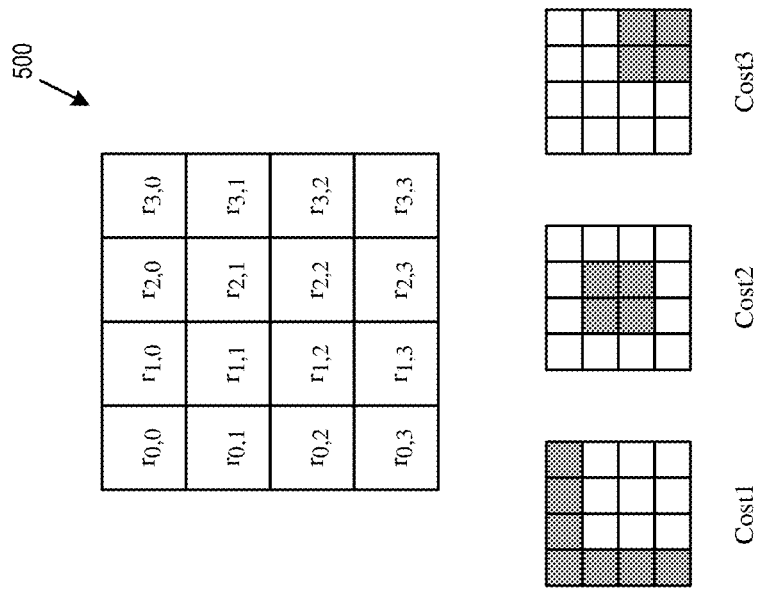
FIG. 5 illustrates the computation of cost for a TU based on measuring the energy of the reconstructed residuals.

In some embodiments, rather than performing boundary matching based on reconstructed pixels, the cost is computed based on the features of the reconstructed residuals, e.g., by measuring the energy of the reconstructed residuals. FIG. 5 illustrates the computation of cost for a TU 500 based on measuring the energy of the reconstructed residuals. In some embodiments, only a subset of the reconstructed residuals is generated for computing the cost of one particular secondary transform kernel size. The cost is calculated as the sum of absolute values of the reconstructed residuals in the subset. (Each residual at a pixel location is denoted as r.)

Subsets of different shapes and sizes can be used to generate the cost. Cost1, Cost2, and Cost3 correspond to calculation of costs based on three different subsets of the reconstructed residuals.

Cost1 is calculated as the sum of absolute values of residuals in the top row and the left, specifically:

$$\text{cost1} = \sum_{x=0}^{w-1} |r_{x,0}| + \sum_{y=0}^{h-1} |r_{0,y}|$$

Cost2 is calculated as the sum of absolute values of the center region of the residuals, specifically:

$$\text{cost2} = \sum_{x=1}^{w-2} \sum_{y=1}^{h-2} |r_{x,y}|$$

Cost3 is calculated as the sum of absolute values of the bottom right corner region of the residuals, specifically:

$$\text{cost3} = \sum_{x=w/2}^{w-1} \sum_{y=h/2}^{h-1} |r_{x,y}|$$

The kernel size of the secondary transform can be implicitly signaled under specific conditions. In some embodiments, the encoder or decoder determines the kernel size by using a fixed value for the kernel size when the size of the block is greater than a threshold. For example, in some embodiments, for blocks with sizes greater than 8×8, the NSST kernel size is implicitly fixed at 8×8 and therefore not explicitly signaled. In some embodiments, the secondary transform kernel size of a block of pixels can be implicitly derived based on the prediction mode and/or the secondary transform mode (a secondary transform mode can be an index that corresponds to a HyGT transform at a particular rotation angle) that is used to code the block of pixels. For example, a block coded by using DC/Planar intra-prediction mode implicitly chooses 4×4 kernel size while other blocks coded by other prediction modes implicitly chooses 8×8 kernel.

In some embodiments, the secondary transform kernel size can be implicitly signaled by a predetermined procedure. A cost is computed for each candidate secondary transform kernel size. The kernel size with the smallest cost will be directly adopted for blocks larger than 8×8. At the decoder side, the selected NSST kernel size can be obtained by the same procedure used by the encoder. For some embodiments, the cost associated with a using a secondary transform kernel size is computed based on features of the reconstructed residuals or based on boundary-matching between the reconstructed pixels and pixels in neighboring blocks. Computing costs based on reconstructed pixels or reconstructed residuals is described above by reference to FIGS. 4 and 5.

Example Video Encoder

Figure 6:
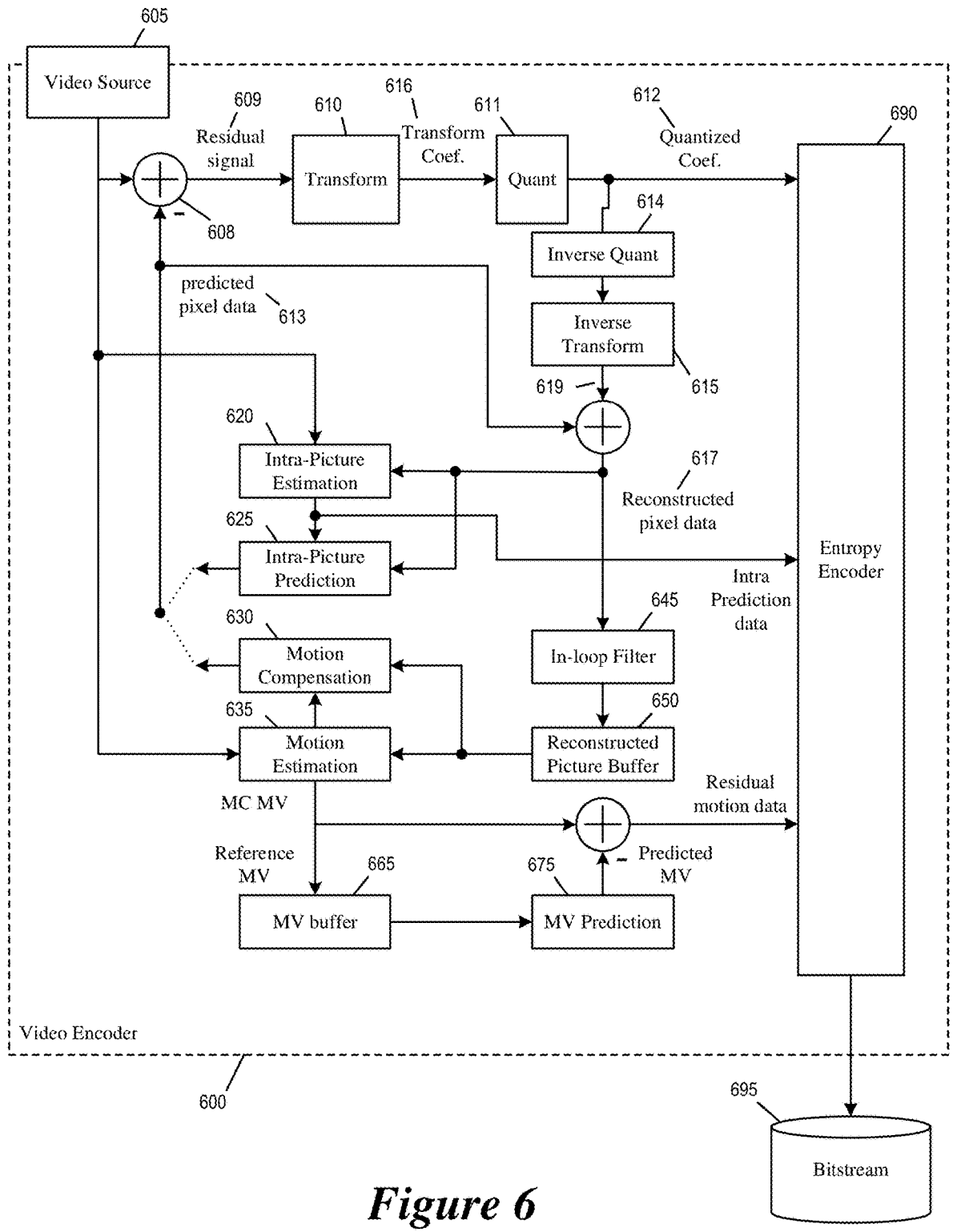
FIG. 6 illustrates an example video encoder that implicitly and explicitly signals secondary transform kernel size.

FIG. 6 illustrates an example video encoder 600 that implicitly and explicitly signals secondary transform kernel size. As illustrated, the video encoder 600 receives input video signal from a video source 605 and encodes the signal into bitstream 695. The video encoder 600 has several components or modules for encoding the video signal 605, including a transform module 610, a quantization module 611, an inverse quantization module 614, an inverse transform module 615, an intra-picture estimation module 620, an intra-picture prediction module 625, a motion compensation module 630, a motion estimation module 635, an in-loop filter 645, a reconstructed picture buffer 650, a MV buffer 665, and a MV prediction module 675, and an entropy encoder 690.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from motion compensation 630 or intra-picture prediction 625. The transform 610 converts the difference (or the residual pixel data or residual signal 609) into transform coefficients (e.g., by performing Discrete Cosine Transform, or DCT). The quantizer 611 quantized the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the prediction pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-picture prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data. Instead of encoding the complete actual MVs in the bitstream 695, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes parameters such as quantized transform data and residual motion data into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
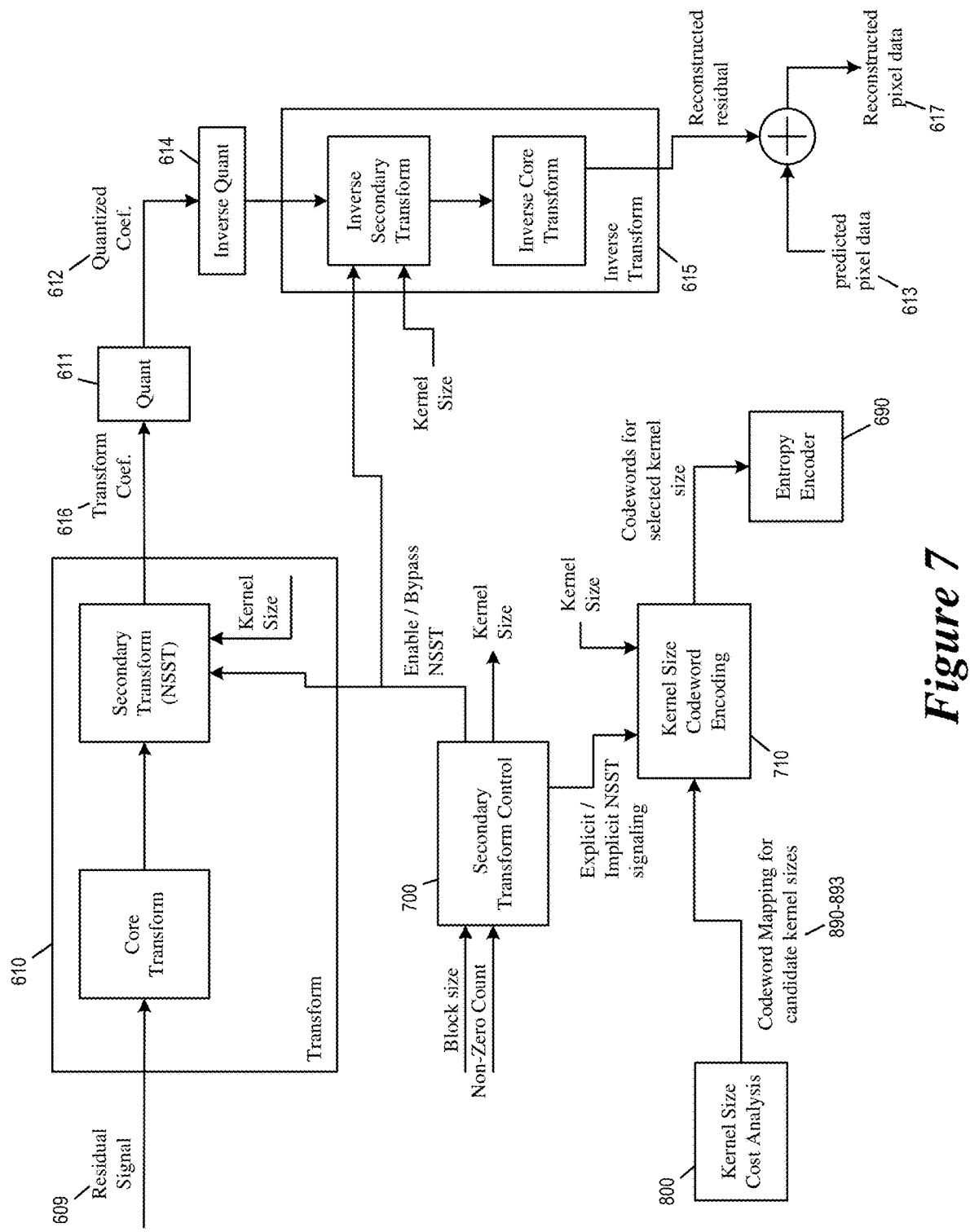
FIG. 7 illustrates portions of the encoder that explicitly and implicitly signals kernel size for secondary transforms.

FIG. 7 illustrates portions of the encoder 600 that explicitly or implicitly signals kernel size for secondary transforms. Specifically, for each block of pixels, the encoder 600 determines whether to perform secondary transform and whether to explicitly or implicitly signal the kernel size of the secondary transform. The encoder 600 also determines the kernel size of the secondary transform, computes costs for different kernel sizes, and maps code words to the different kernel sizes.

As illustrated, the transform module 610 performs both core transform and secondary transform (NSST) on the residual signal 609, and the inverse transform module 615 performs corresponding inverse core transform and inverse secondary transform. The encoder 600 selects a core transform and a secondary transform for the transform module 610 and the inverse transform module 615. The encoder 600 also determines the kernel size for the secondary transform and the inverse secondary transform.

The encoder 600 includes a secondary transform control module 700, a kernel size code word encoding module 710, and a kernel size cost analysis module 800.

The secondary control module 700 determines whether to perform secondary transform and whether to explicitly or implicitly signal secondary transform kernel size for the current block of pixels. The kernel size may be always signaled implicitly. The secondary transform control module 700 may also determine the kernel size. The secondary transform control module 700 makes these decisions based on the width, height, or size of the block (e.g., the size of the TU) and on the count of non-zero transform coefficients in a particular subset of the transform coefficients. The secondary control module 700 enables or disables the secondary transform in the transform module 610 and the inverse secondary transform in the inverse transform module 615. The secondary control module 700 controls whether to explicitly encode the kernel size with or without controlling the kernel size code word encoding module 710. In one example, when secondary control module 700 decides whether the secondary transform is applied to a particular region of the TU (or a particular subset of transform coefficients) (e.g., top-left 4×4 or 8×8, or the top-left 4×4, the bottom-left 4×4, and top-right 4×4), the secondary transform is perfomed depending on the number of non-zero transform coefficients in the particular subset. For example, the secondary transform is performed only when the number of non-zero transform coefficients within the particular subset is greater than a first threshold. Non-zero transform coefficients outside of the particular subset do not count toward triggering secondary transform operations. The first threshold can be zero for example.

For another example, the secondary transform is performed only when the number of non-zero transform coefficients within the particular subset is not greater than another threshold, such as zero.

The kernel size code word encoding module 710 receives code word mapping 890-893 for various kernel sizes from the kernel size cost analysis module 800. The kernel size code word encoding module 710 receives the kernel size for the secondary transform as determined by the encoder 600. The kernel size code word encoding module 710 maps the selected kernel size to one of the code words assigned to the various possible kernel sizes. If the secondary transform control 700 has decided to explicitly signal the kernel size rather than to implicitly signal the kernel size, the mapped code word is provided to the entropy encoder 690 to be included in the bitstream 695.

Figure 8:
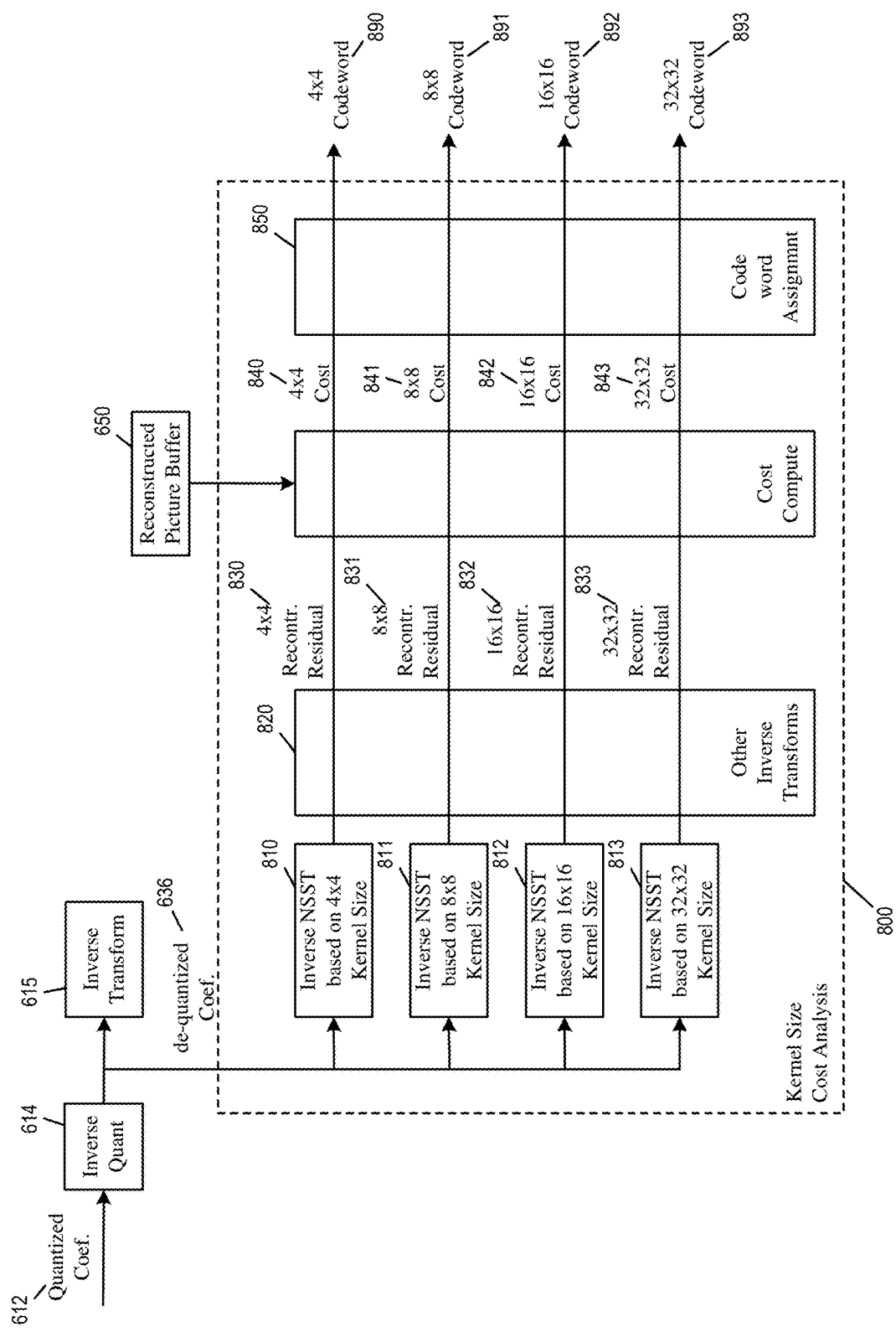
FIG. 8 conceptually illustrates the cost analysis and the code word assignment operations performed by the kernel size cost analysis module.

FIG. 8 conceptually illustrates the cost analysis and the code word assignment operations performed by the kernel size cost analysis module 800. As illustrated, the kernel size cost analysis module 800 receives the output of the inverse quantization module 614 for the current block, which includes the de-quantized transform coefficients 636. The kernel size cost analysis module 800 performs the inverse transform operations on the transform coefficients 636 based on each of the candidate kernel sizes 810-813 (e.g., 4×4, 8×8, 16×16, 32×32). The kernel size cost analysis module 800 may further perform other requisite inverse transforms 820 (e.g., inverse core transform). The result of the inverse transform under each candidate kernel size is taken as the reconstructed residuals for that candidate kernel size (reconstructed residual 830-833 for kernel sizes 810-813, respectively). The kernel size cost analysis module 800 then computes a cost for each of the candidate kernel sizes (costs 840-843 for kernel sizes 810-813, respectively). The costs are computed based on the reconstructed residuals of the inverse transform and/or pixel values retrieved from the reconstructed picture buffer 650. The computation of cost of a candidate kernel size is described by reference to FIGS. 3-5 above.

Based on the result of the computed costs of the candidate kernel sizes, the kernel size cost analysis module 800 performs code word assignment 850 and produces code word mappings 890-893 for the different kernel sizes. The candidate kernel size with the lowest computed cost is chosen or identified as the predicted kernel size and assigned the shortest code word, which reduces bit rate when the predicted kernel size matches the kernel size that was actually used for secondary transform. The assignment of code words for other candidate kernel sizes is based on an ordering of the different candidate kernel sizes based on their respective costs.

Example Video Decoder

Figure 9:
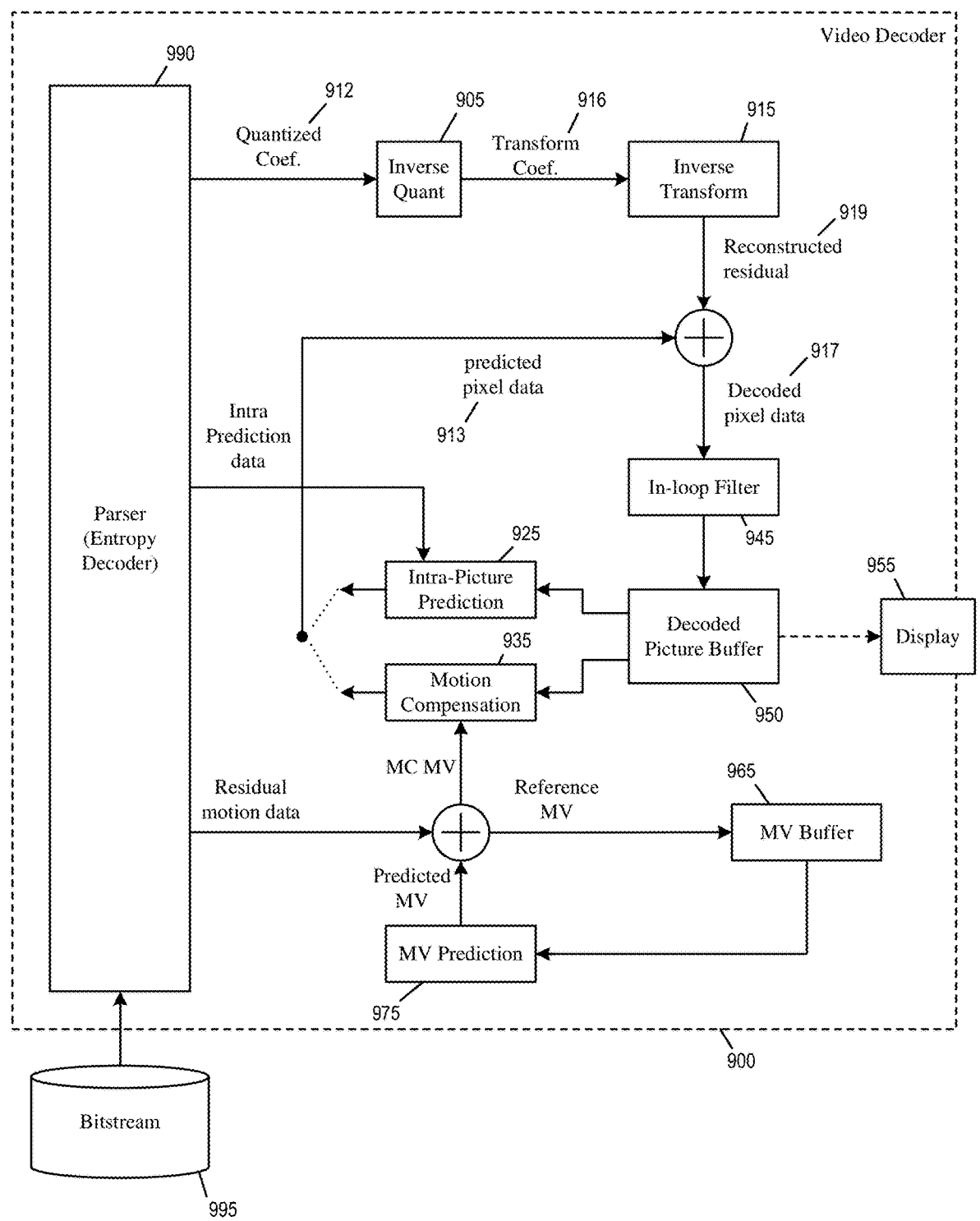
FIG. 9 illustrates an example video decoder that may receive signaling of secondary transform kernel sizes explicitly or implicitly.

FIG. 9 illustrates an example video decoder 900 that may receive signaling of secondary transform kernel sizes explicitly or implicitly. As illustrated, the video decoder 900 is an image-decoding or video-decoding circuit that receives a bitstream 995 and decodes the content of the bitstream into pixel data of video frames for output (such as to be displayed by the display device 955). The video decoder 900 has several components or modules for decoding the bitstream 995, including an inverse quantization module 905, an inverse transform module 915, an intra-picture prediction module 925, a motion compensation module 935, an in-loop filter 945, a decoded picture buffer 950, a MV buffer 965, a MV prediction module 975, and a bitstream parser 990.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman coding.

The inverse quantization module 905 de-quantizes the quantized data (or quantized coefficients) 912 to obtain transform coefficients, and the inverse transform module 915 performs inverse transform on the transform coefficients 916 to produce reconstructed residual signal 919. The reconstructed residual signal 919 is added with prediction pixel data 913 from the intra-prediction module 925 or the motion compensation module 935 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-picture prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device 955 receives pixel values from the decoded picture buffer 950 through a pixel transport.

The motion compensation module 935 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
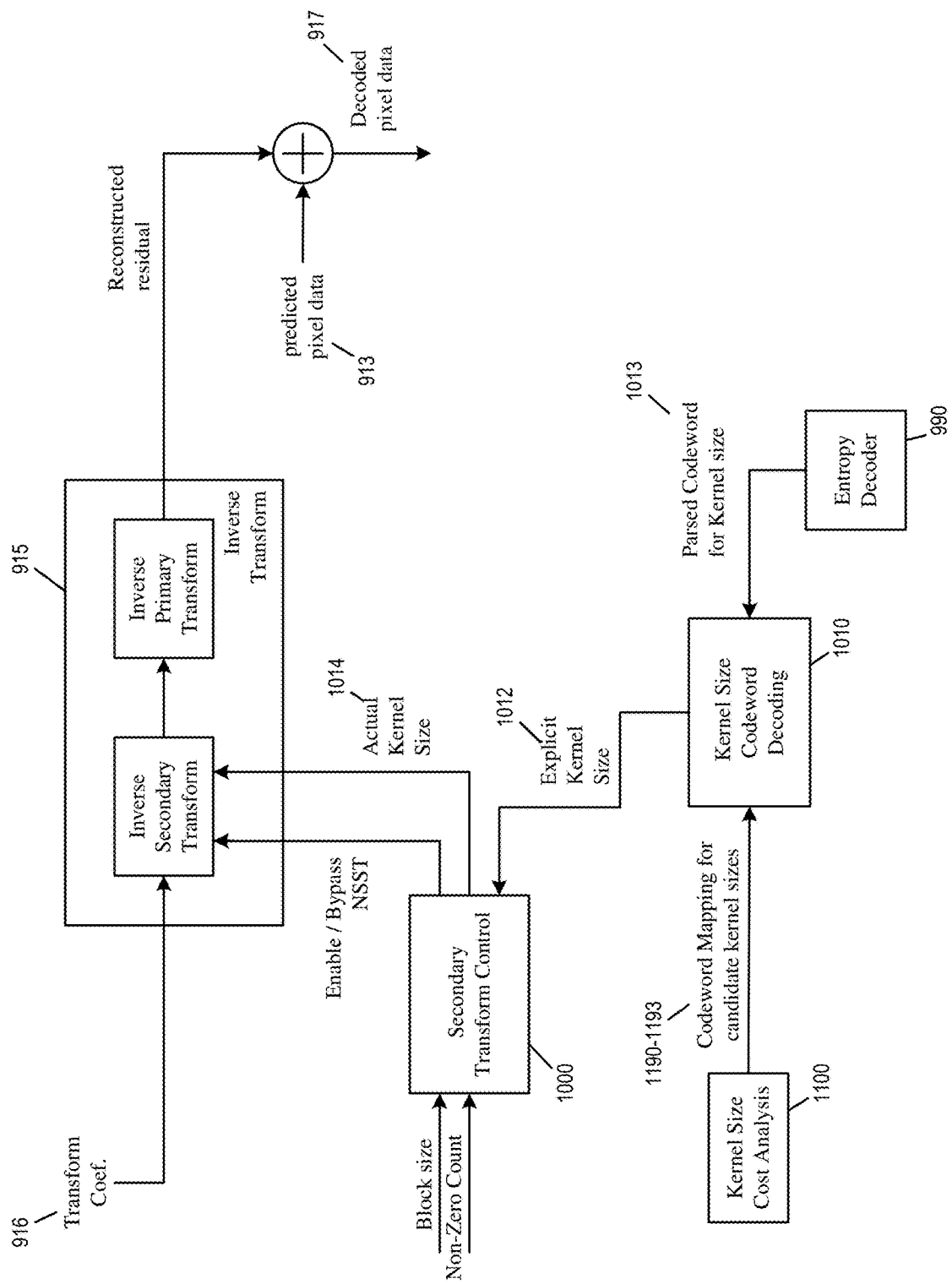
FIG. 10 illustrates portions of the decoder that processes explicit and implicit signaling of secondary transform kernel sizes.

FIG. 10 illustrates portions of the decoder 900 that processes explicit or implicit signaling of secondary transform kernel sizes.

Specifically, for each block of pixels, the decoder 900 determines whether to perform secondary transform and whether to implicitly derive the kernel size. The decoder 900 also determines the kernel size of the secondary transform, computes costs for different kernel sizes, and assigns the code words that are mapped to the different kernel sizes.

The decoder 900 includes a secondary transform control module 1000, a kernel size code word decoding module 1010, and a kernel size cost analysis module 1100.

The secondary transform control module 1000 determines whether to perform secondary transform and whether to expect explicitly signaled kernel size or to derive the kernel size implicitly. The kernel size may be always derived implicitly. The secondary control module 1000 makes these decisions based on the size of the block (e.g., the size of the TU) and/or the count of non-zero transform coefficients in a particular subset of the transform coefficients. The secondary control module 1000 controls whether to enable or bypass the inverse secondary transform in the inverse transform module 915. In one example, when the secondary control module 1000 decides whether to perform the inverse secondary transform to a particular region of the TU, it decides depending on the count of non-zero transform coefficients in the particular subset. For example, the inverse secondary transform is performed only when the number of non-zero transform coefficients within the particular subset is greater than a first threshold, such as zero. Non-zero transform coefficients outside of the particular region do not count toward triggering secondary transform operations. In another embodiment, the inverse secondary transform is performed only when the number of non-zero transform coefficients within the particular subset is not greater than an another threshold, such as zero.

In some embodiments, the non-separable secondary transform (NSST) is applied according to an NSST kernal size selected fom a plurality of possible kernal sizes. The decoder further derives the NSST kernal size according to a width or a height of the block. Then, the decoder applies the inversed NSST by applying inverse 4×4 NSST to first 8 or 16 coefficients in a scanning order for a transform block or a top-left 4×4 region based on the width or the height of the block being less than a second threshold or applying inverse 8×8 NSST to first 8 or 16 coefficients in a scanning order for a transform block or a top-left 4×4 region based on the width and the height of the block being greater than or equal to the second threshold. In this embodiment, the second threshold is equal to 8.

The secondary control module 1000 also provides the actual kernel size 1014 to the inverse transform 915. This actual kernel size 1014 can be an explicitly signaled kernel size 1012 decoded by the kernel size decoding module 1000 by parsing a code word for kernel size 1013 from the bitstream 995, or an implicitly signaled kernel size derived from the size of the block and/or a count of non-zero transform coefficients in the block determined by the secondary transform control 1000.

The entropy decoder 990 parses the bitstream 995 and may obtain the code word 1013 for the kernel size of the secondary transform (NSST) that was used to encode the current block of pixels. The kernel size code word decoding module 1010 maps the parsed code word 1013 into the explicitly signaled kernel size 1012 by looking up code word mapping 1190-1193 for kernel sizes.

Figure 11:
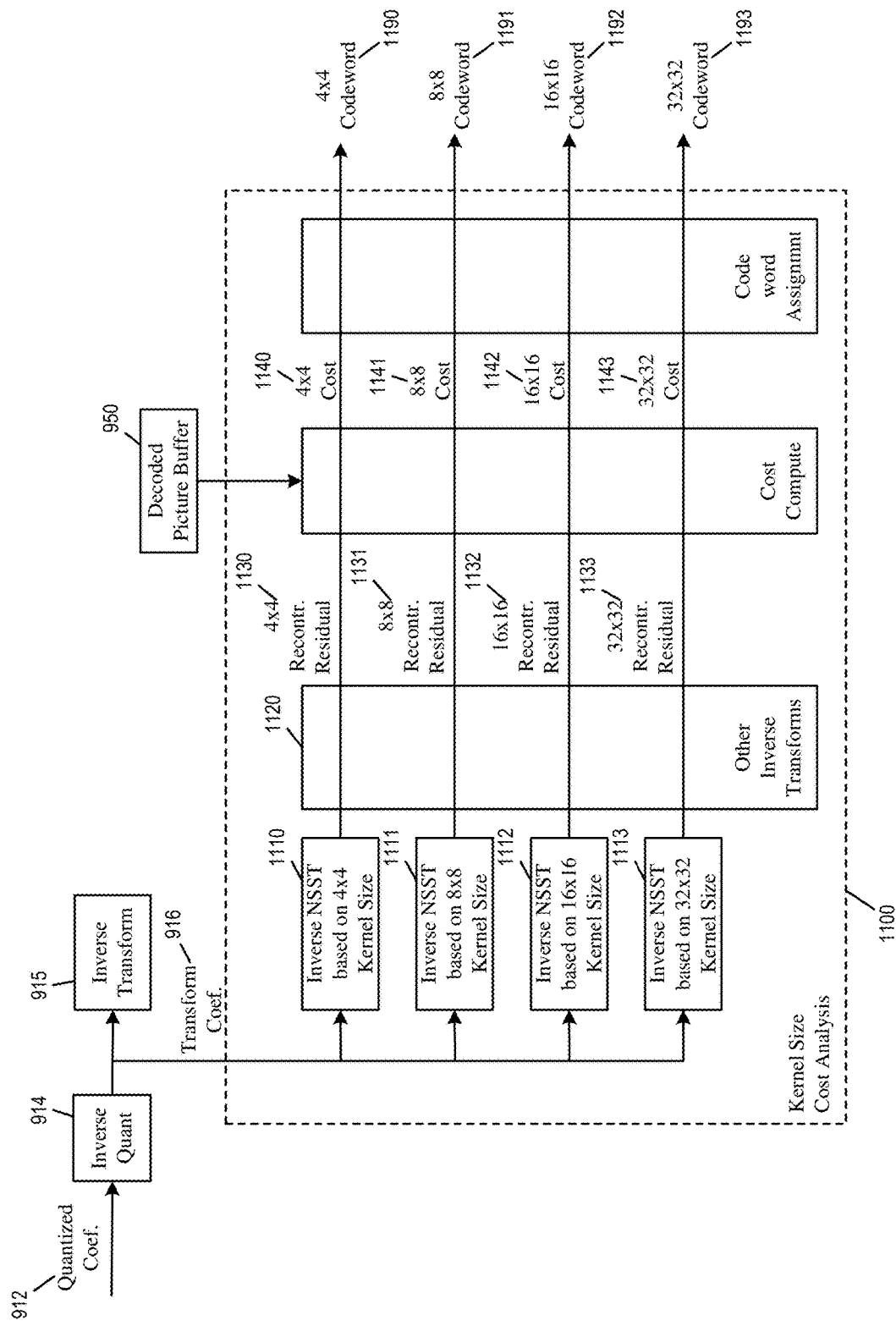
FIG. 11 conceptually illustrates the cost analysis and code word assignment operations performed for the kernel size code word decoding module.

The kernel size cost analysis module 1100 provides the code word mapping 1190-1193 by performing cost analysis of the different candidate kernel sizes in order to identify the code words assigned to candidate kernel sizes. FIG. 11 conceptually illustrates the cost analysis and code word assignment operations performed for the kernel size code word decoding module 1000.

As illustrated, the kernel size cost analysis module 1100 receives the output of the inverse quantization module 914 for the current block, which includes the de-quantized transform coefficients 916.

The kernel size cost analysis module 1100 performs the inverse transform operations on the transform coefficients 916 for each of the candidate kernel sizes 1110-1113 (e.g., 4×4, 8×8, 16×16, 32×32). The kernel size cost analysis module 1100 may further perform other requisite inverse transforms 1120 (e.g., inverse core transform after each of the inverse secondary transforms). The result of the inverse transform under each candidate kernel size is taken as reconstructed residuals for that candidate kernel size (reconstructed residual 1130-1133 for kernel sizes 1110-1113, respectively). The kernel size cost analysis module 1100 then computes a cost for each of the candidate kernel sizes (costs 1140-1143 for kernel sizes 1110-1113, respectively). The costs are computed based on the reconstructed residuals of the inverse transform and/or pixel values retrieved from the reconstructed picture buffer 950 (e.g., for the reconstructed pixels of neighboring blocks). The computation of the cost of a candidate kernel size is described by reference to FIGS. 3-5 above.

Based on the result of the computed costs of the candidate kernel sizes, the kernel size cost analysis module 1100 performs code word assignment 1140 and produces code word mappings 1190-1193 for the different kernel sizes. The mappings assign a code word to each candidate kernel size. The candidate kernel size with the lowest computed cost is chosen or identified as the predicted kernel size and assigned the shortest code word, which reduced bit rate when the predicted kernel size matches the kernel size that was actually used for secondary transform. The assignment of code words for other candidate kernel sizes is based on an ordering of the different candidate kernel sizes based on their respective cost.

Figure 12:
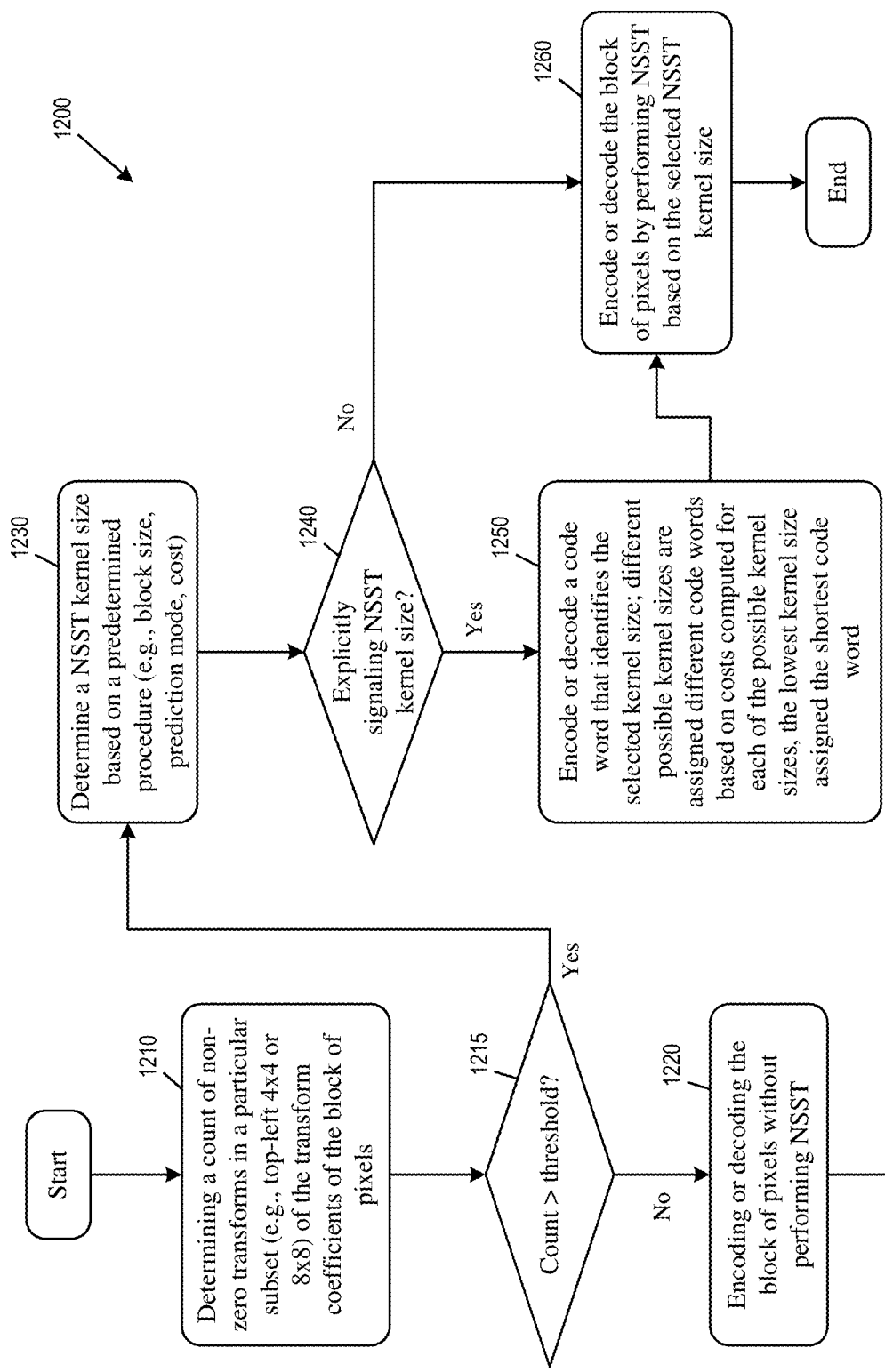
FIG. 12 conceptually illustrates a process for signaling kernel size of secondary transform.

FIG. 12 conceptually illustrates a process 1200 for implicitly or explicitly signaling kernel size of secondary transform. In some embodiments, one or more processing units (e.g., a processor) of a computing device implementing the encoder 600 or the decoder 900 performs the process 1200 by executing instructions stored in a computer readable medium. In some embodiments, an electronic apparatus implementing the encoder 600 or the decoder 900 performs the process 1200.

In some embodiments, the encoder 600 performs the process 1200 when it is encoding a block of pixels into the bitstream 695 for storage or transmission. In some embodiments, the decoder 900 performs the process 1200 when it is decoding a block of pixels from the bitstream 995 for output. The encoder or decoder performing the process 1200 determines whether to perform secondary transform (NSST) and/or inverse secondary transform, whether the kernel size is explicitly signaled or implicitly signaled, and the size of the kernel of the secondary transform.

The encoder or decoder determines (at step 1210) a count of the number of non-zero coefficients in a particular subset (e.g., 315) of the transform coefficients of the block of pixels. In some embodiments, the particular subset of transform coefficients corresponds to the subset of the transform coefficients that the NSST or inverse NSST operates on. Transform coefficients that fall outside of this particular subset are not included in the count since they are not part of the NSST or inverse NSST. The particular subset may be top-left 4×4 or 8×8 transform coefficients, or the first 8, 16, 48, or 64 transform coefficients in a scanning order (e.g. forward scanning order or diagonal scanning order) for a transform block, top-left 8×8 region, or top-left 4×4 region. The particular subset may exclude the transform coefficient in the DC position (the first position) of a transform block. The particular subset of the transformed coefficients depends on the width of the block or the height of the block.

The encoder or decoder determines (at step 1215) whether the count of the non-zero transforms is greater than a threshold. In some embodiments, the threshold is two. If the count is greater than a threshold, i.e., there are sufficient number of non-zero coefficients in the particular subset, the process proceeds to step 1230. If the count is not greater than the threshold, the encoder or decoder encodes or decodes (at step 1220) the block of pixels without performing the secondary transform.

At the step 1230, the encoder or decoder determines a NSST kernel size based on a predetermined procedure. In some embodiments, such procedure is based on properties of the block, such as the size of the block, a number of non-zero coefficients, and/or costs of the different possible kernel sizes. In some embodiments, the encoder or decoder uses a fixed value for the kernel size when the size of the block is greater than a threshold. In some embodiments, the encoder or decoder selects the kernel size based on the intra-prediction mode used to encode the block of pixels. In some embodiments, the encoder or decoder computes a cost for each of the different possible kernel sizes for coding the block of pixels and then selects the kernel size associated with a lowest cost. The cost associated with the kernel size may be computed by reconstructing pixels of a sub-block of the block and by comparing the reconstructed sub-block with neighbor pixels of the block.

The encoder or decoder determines (at step 1240) whether the NSST kernel size is explicitly signaled or implicitly signaled. In some embodiments, such procedure is based on the size of the block. In some embodiments, such determination is based on properties of the block, such as the size of the block, a number of non-zero coefficients, and/or costs of the different possible kernel sizes. In some embodiments, an explicit flag for selecting the kernel size is present when the size of the block is greater than a threshold. In some embodiments, an explicit flag for selecting the kernel size is present when a count of non-zero coefficients in a subset of the transform coefficients is greater than a threshold (such a threshold may or may not be the same as the threshold for determining whether there is sufficient number of non-zero transform coefficients for performing the NSST). If the kernel size is to be implicitly signaled, the process proceeds to 1260 without explicit signaling. If the kernel size is to be explicitly signaled, the process proceeds to 1250.

At step 1250, the encoder encodes (or decoder decodes) a code word that identifies the selected NSST kernel size. Different possible kernel sizes are assigned different code words based on costs computed for each of the possible kernel sizes. The lowest cost kernel size is assigned the shortest code word. In some embodiments, the code word may be part of a flag that is coded in a slice header, a sequence header, or a picture header of a bitstream. The process then proceeds to step 1260.

At step 1260, the encoder encodes (or decoder decodes) the block of pixels by performing the secondary transform based on the selected NSST kernel size. The process 1200 then ends.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 13:
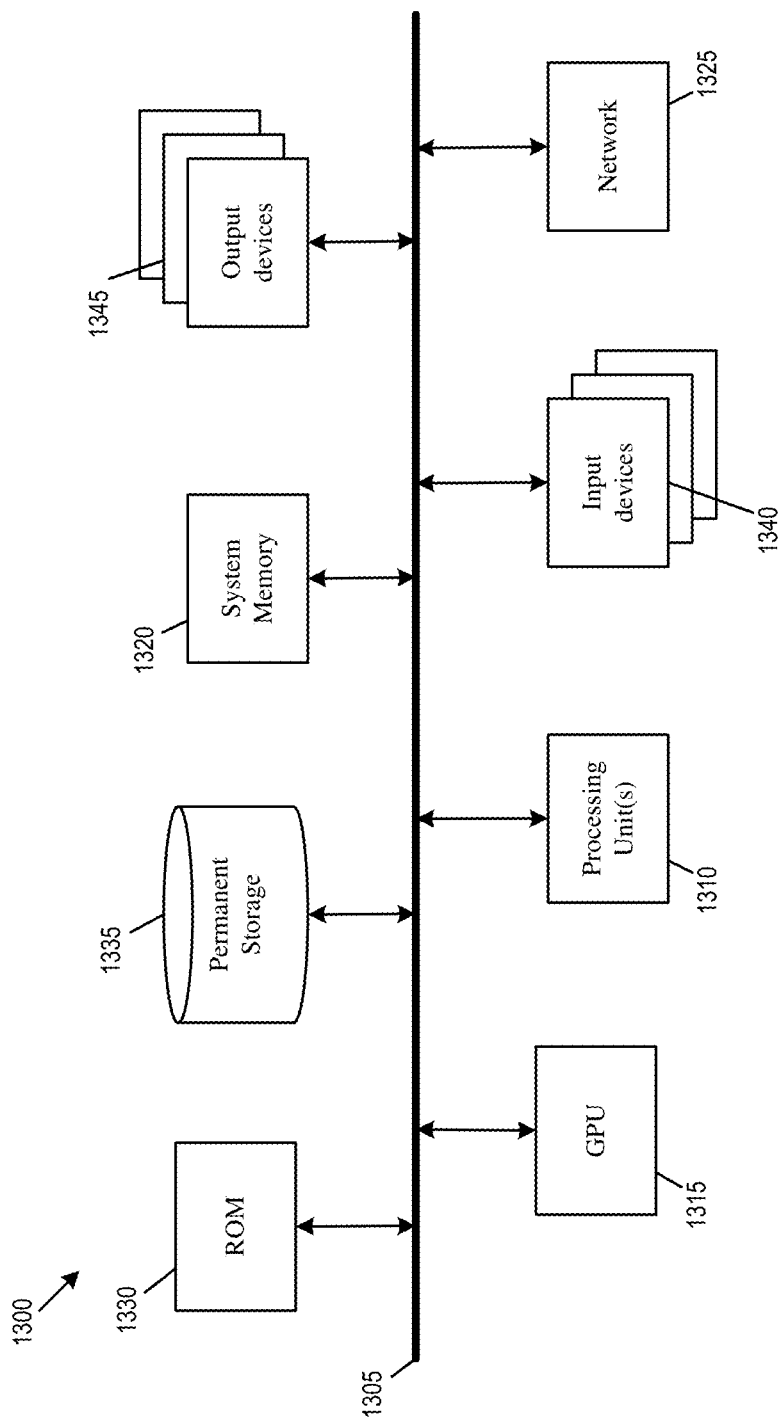
FIG. 13 conceptually illustrates an electronic system with which some embodiments of the present disclosure are implemented.

FIG. 13 conceptually illustrates an electronic system 1300 with which some embodiments of the present disclosure are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics-processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the GPU 1315, the read-only memory 1330, the system memory 1320, and the permanent storage device 1335.

From these various memory units, the processing unit(s) 1310 retrieves instructions to execute and data to process in order to execute the processes of the present disclosure. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the present disclosure use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random-access memory. The system memory 1320 stores some of the instructions and data that the processor needs at runtime. In some embodiments, processes in accordance with the present disclosure are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 1 and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least,"

the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
    receiving data associated with a block of pixels to be decoded as a current block of a current picture of video;
    applying inverse non-separable secondary transform (NSST) to transformed coefficients of the block of pixels according to an NSST kernel size selected from a plurality of possible kernel sizes when determining a count of non-zero transformed coefficients in a particular subset of the transformed coefficients of the block of pixels is greater than a first threshold; and
    decoding using the selected NSST kernel size that is derived according to a width of the block or a height of the block,
    wherein the applying of the inverse NSST comprises:
        applying inverse 4×4 NSST to first 8 or 16 coefficients for a transform block based on the width or the height of the block being less than a second threshold; or
        applying inverse 8×8 NSST to first 8 or 16 coefficients for a transform block based on the width and the height of the block being greater than or equal to the second threshold,
    wherein the inverse 4×4 NSST and the inverse 8×8 NSST indicate different kernel sizes and the particular subset of the transformed coefficients depends on the width of the block or the height of the block.

2. The method of claim 1, wherein applying the inverse NSST comprises selecting the NSST kernel size by implicitly deriving a fixed value for the NSST kernel size when the width and the height of the block are greater than or equal to the second threshold.

3. The method of claim 1, wherein the NSST kernel size is implicitly derived based on an intra-prediction mode of the block of pixels.

4. The method of claim 1, wherein the NSST kernel size is implicitly derived based on costs associated with each of the plurality of kernel sizes for decoding the block of pixels, wherein the NSST kernel size is the kernel size associated with a lowest cost.

5. The method of claim 4, further comprising computing a cost associated with each of the plurality of possible kernel sizes by applying the inverse NSST with each possible kernel size to a subset of transform coefficients.

6. The method of claim 4, further comprising computing a cost associated with each of the plurality of possible kernel sizes by reconstructing pixels of the block based on NSST with each possible kernel size and by comparing the reconstructed pixels of the block with reconstructed pixels of a neighboring block.

7. The method of claim 4, further comprising computing a cost associated with each of the plurality of possible kernel sizes by reconstructing residuals of the block based on NSST with each possible kernel size and by measuring an energy of the reconstructed residuals.

8. The method of claim 1, wherein applying the NSST comprises selecting the NSST kernel size by incorporating a flag indicating the selected NSST kernel size in a bitstream or parsing the flag indicating the selected NSST kernel size from the bitstream.

9. The method of claim 8, wherein the flag is in a slice header, a sequence header, or a picture header of the bitstream.

10. The method of claim 1, wherein applying the inverse NSST comprises selecting the NSST kernel size based on the width, the height, or the size of the block without incorporating a flag indicating the selected NSST kernel size in a bitstream or parsing the flag indicating the selected NSST kernel size from the bitstream.

11. The method of claim 1, wherein applying the inverse NSST comprises deriving the NSST kernel size based on a predetermined criteria without incorporating a flag indicating the selected NSST kernel size in a bitstream or parsing the flag indicating the selected NSST kernel size from the bitstream.

12. The method of claim 1, wherein applying the inverse NSST comprises selecting the NSST kernel size by incorporating a flag indicating the selected NSST kernel size in a bitstream or parsing the flag indicating the selected NSST kernel size from the bitstream when the count of non-zero coefficients in the subset of the transform coefficients is greater than the first threshold.

13. The method of claim 1, wherein applying the NSST comprises selecting the NSST kernel size by decoding a code word that identifies the selected NSST kernel size, wherein different possible kernel sizes are assigned different code words based on costs computed for each of the possible kernel sizes, wherein a lowest cost kernel size is assigned a shortest code word.

14. An electronic apparatus comprising:
   a circuit configured to perform operations comprising:
      receiving data associated with a block of pixels to be decoded as a current block of a current picture of video;
      applying inverse non-separable secondary transform (NSST) to transformed coefficients of the block of pixels according to an NSST kernel size selected from a plurality of possible kernel sizes when determining a count of non-zero transformed coefficients in a particular subset of the transformed coefficients of the block of pixels is greater than a first threshold; and
      decoding using the selected NSST kernel size that is derived according to a width of the block or a height of the block, wherein, in applying the inverse NSST, the circuit performs operations comprising:
         applying inverse 4×4 NSST to first 8 or 16 coefficients for a transform block based on the width or the height of the block being less than a second threshold; or
         applying inverse 8×8 NSST to first 8 or 16 coefficients for the transform block based on the width and the height of the block being greater than or equal to the second threshold,
      wherein the inverse 4×4 NSST and the inverse 8×8 NSST indicate different kernel sizes and the particular subset of the transformed coefficients depends on the width of the block or the height of the block.

15. The method of claim 1, wherein applying the inverse NSST further comprises applying the inverse NSST when a NSST index is not zero.

16. The method of claim 2, wherein applying inverse 4×4 NSST to first 8 or 16 coefficients or applying inverse 8×8 NSST to first 8 or 16 coefficients are in diagonal scanning order.

17. The method of claim 2, wherein the first threshold is equal to 0.

18. The method of claim 2, wherein the second threshold is equal to 8.

19. The method of claim 2, further comprising:
   applying the inverse non-separable secondary transform (NSST) to the transformed coefficients of the block of pixels when a count of non-zero transformed coefficients in a particular subset of the transformed coefficients of the block of pixels is not greater than one other threshold.

20. The method of claim 19, wherein the other threshold is equal to 0.

* * * * *